United States Patent
Chilton et al.

(10) Patent No.: US 12,236,423 B1
(45) Date of Patent: Feb. 25, 2025

(54) SYSTEMS AND METHODS FOR FEDERATED IDENTITY MANAGEMENT

(71) Applicant: Wells Fargo Bank, N.A., San Francisco, CA (US)

(72) Inventors: Jana L. Chilton, San Francisco, CA (US); Angira Goswami, Cupertino, CA (US); Muhammad Farukh Munir, Pittsburg, CA (US); Traci Nguyen, San Francisco, CA (US); Priyamvada Singh, San Francisco, CA (US); Darrell L. Suen, San Ramon, CA (US); Kenneth L. Wright, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/850,775

(22) Filed: Jun. 27, 2022

Related U.S. Application Data

(63) Continuation of application No. 15/902,579, filed on Feb. 22, 2018, now Pat. No. 11,373,176.

(51) Int. Cl.
*G06Q 30/00* (2023.01)
*G06Q 20/32* (2012.01)
(Continued)

(52) U.S. Cl.
CPC ..... *G06Q 20/3829* (2013.01); *G06Q 20/3278* (2013.01); *G06Q 20/3821* (2013.01);
(Continued)

(58) Field of Classification Search
CPC ............. G06Q 20/3829; G06Q 20/026; G06Q 20/023; G06Q 20/4012
See application file for complete search history.

(56) References Cited

U.S. PATENT DOCUMENTS

| 6,098,053 A | * | 8/2000 | Slater | ............... G06Q 20/204 |
| | | | | 705/35 |
| 6,990,588 B1 | | 1/2006 | Yasukura | |

(Continued)

FOREIGN PATENT DOCUMENTS

| CN | 110611656 A | * | 12/2019 | ......... H04L 63/0815 |
| JP | 2017511542 A | * | 4/2017 | ............. G06F 13/00 |
| JP | 6920530 B2 | * | 8/2021 | ............. G06F 21/31 |

OTHER PUBLICATIONS

David Temoshok et al. "Developing Trust Frameworks to Support Identity Federations." (Jan. 2018). Retrieved online Sep. 25, 2024. https://nvlpubs.nist.gov/nistpubs/ir/2018/NIST.IR.8149.pdf (Year: 2018).*

(Continued)

*Primary Examiner* — James A Reagan
(74) *Attorney, Agent, or Firm* — Foley & Lardner LLP

(57) ABSTRACT

A computer-implemented method includes: generating a GUI including a first button selectable to register identity information and a second button selectable to request identity information; receiving, in response to the first button being selected, pieces of identity information regarding a customer; receiving a preference for each piece of identity information from the customer that governs distribution of identity information to requesting parties; generating a customer-specific key; provisioning the key to an identification chip of a customer computing device; transmitting the graphical user interface to a computing device of a requesting party other than the customer; receiving, in response to the second button being selected, the key, a request for identity information, and an identity of the requesting party; identifying the customer based on the key; determining that a preference for the requested piece of identity information (Continued)

is met; and providing the requested piece of identity information to the requesting party.

18 Claims, 9 Drawing Sheets

(51) Int. Cl.
*G06Q 20/38* (2012.01)
*G06Q 20/40* (2012.01)
*H04L 9/40* (2022.01)

(52) U.S. Cl.
CPC ... *G06Q 20/40145* (2013.01); *H04L 63/0815* (2013.01); *H04L 63/083* (2013.01)

(56) References Cited

U.S. PATENT DOCUMENTS

| | | | |
|---|---|---|---|
| 7,444,519 B2 | 10/2008 | Laferriere et al. | |
| 7,509,672 B1 | 3/2009 | Horwitz et al. | |
| 8,522,039 B2 | 8/2013 | Hyndman et al. | |
| 8,881,247 B2* | 11/2014 | Mendelovich | H04L 9/3213 |
| | | | 713/186 |
| 8,887,229 B1 | 11/2014 | Ellmore | |
| 9,092,603 B2* | 7/2015 | Umamaheswaran | |
| | | | G06F 21/316 |
| 9,253,199 B2* | 2/2016 | Engert | H04L 51/212 |
| 9,307,034 B1* | 4/2016 | Keyani | H04L 67/53 |
| 9,842,220 B1 | 12/2017 | Brisebois et al. | |
| 9,954,828 B1* | 4/2018 | Chandrasekhar | H04L 9/0894 |
| 9,992,287 B2* | 6/2018 | Keyani | H04W 12/084 |
| 10,075,437 B1* | 9/2018 | Costigan | H04L 63/166 |
| 10,095,860 B1* | 10/2018 | McClintock | G06F 21/45 |
| 10,129,252 B1* | 11/2018 | Suen | H04L 63/0861 |
| 10,140,600 B2* | 11/2018 | Hessler | G06F 21/10 |
| 10,187,374 B2* | 1/2019 | Brannon | H04L 63/0815 |
| 10,396,985 B1* | 8/2019 | Nagelberg | H04L 9/3247 |
| 10,474,836 B1 | 11/2019 | Cieslak et al. | |
| 10,552,839 B2* | 2/2020 | Narasimhan | G06Q 40/02 |
| 11,057,364 B2* | 7/2021 | Rykowski | H04W 12/06 |
| 11,373,176 B2* | 6/2022 | Chilton | G06Q 20/3278 |
| 2002/0007461 A1* | 1/2002 | Garrison | G06F 21/6218 |
| | | | 709/217 |
| 2004/0143521 A1 | 7/2004 | Barnard et al. | |
| 2005/0278547 A1 | 12/2005 | Hyndman et al. | |
| 2006/0080730 A1 | 4/2006 | Cahill et al. | |
| 2006/0236382 A1 | 10/2006 | Hinton et al. | |
| 2007/0050216 A1 | 3/2007 | Wright et al. | |
| 2009/0070262 A1* | 3/2009 | Olliphant | G06Q 20/26 |
| | | | 705/35 |
| 2009/0101707 A1* | 4/2009 | Kurasaki | G07F 7/10 |
| | | | 235/380 |
| 2009/0177587 A1 | 7/2009 | Siegal et al. | |
| 2009/0300355 A1 | 12/2009 | Crane et al. | |
| 2011/0219151 A1* | 9/2011 | Coile | G06F 21/73 |
| | | | 710/30 |
| 2011/0276485 A1 | 11/2011 | Varga | |
| 2011/0320531 A1* | 12/2011 | Cheah | H04L 67/10 |
| | | | 709/203 |
| 2012/0078949 A1 | 3/2012 | Allen et al. | |
| 2012/0209735 A1* | 8/2012 | Subramanian | H04L 9/321 |
| | | | 705/26.1 |
| 2012/0215688 A1* | 8/2012 | Musser | G06Q 20/385 |
| | | | 705/40 |
| 2013/0304661 A1* | 11/2013 | Umamaheswaran | G06Q 40/02 |
| | | | 705/325 |
| 2014/0074550 A1* | 3/2014 | Chourey | G06Q 30/02 |
| | | | 705/7.29 |
| 2014/0074724 A1* | 3/2014 | Gordon | G06Q 20/10 |
| | | | 705/44 |
| 2014/0214675 A1* | 7/2014 | Sharma | G06Q 20/10 |
| | | | 705/44 |
| 2014/0229737 A1* | 8/2014 | Roth | H04L 9/0618 |
| | | | 713/176 |
| 2014/0230007 A1 | 8/2014 | Roth et al. | |
| 2014/0279489 A1* | 9/2014 | Russell | H04L 63/105 |
| | | | 705/42 |
| 2015/0012433 A1* | 1/2015 | Yang | G06Q 20/3265 |
| | | | 705/35 |
| 2015/0058931 A1* | 2/2015 | Miu | G06Q 20/02 |
| | | | 707/784 |
| 2015/0058950 A1* | 2/2015 | Miu | G06F 21/31 |
| | | | 726/7 |
| 2015/0067813 A1 | 3/2015 | Cha et al. | |
| 2015/0156192 A1* | 6/2015 | Yang | H04L 63/0815 |
| | | | 726/6 |
| 2015/0312233 A1* | 10/2015 | Graham, III | H04L 63/0435 |
| | | | 713/171 |
| 2015/0356305 A1 | 12/2015 | Volvovski et al. | |
| 2016/0104008 A1 | 4/2016 | Lacey et al. | |
| 2016/0219114 A1* | 7/2016 | Keyani | G06Q 20/204 |
| 2016/0283740 A1 | 9/2016 | Roundtree | |
| 2016/0283918 A1* | 9/2016 | Weinflash | G06Q 20/403 |
| 2017/0006009 A1* | 1/2017 | Hessler | G06F 21/316 |
| 2017/0126661 A1* | 5/2017 | Brannon | H04L 63/0815 |
| 2017/0295155 A1* | 10/2017 | Wong | H04L 67/306 |
| 2018/0005239 A1* | 1/2018 | Schlesinger | G06K 19/06028 |
| 2018/0145968 A1* | 5/2018 | Rykowski | G06F 21/46 |
| 2018/0336554 A1* | 11/2018 | Trotter | H04L 63/0853 |
| 2019/0012454 A1* | 1/2019 | McClintock | H04L 63/0815 |
| 2019/0253431 A1* | 8/2019 | Atanda | G06F 21/62 |
| 2019/0259029 A1* | 8/2019 | Chilton | H04L 63/0815 |

OTHER PUBLICATIONS

Thales DIS. "What is SAML Authentication and who needs it?" (Jan. 25, 2017). Retrieved online Sep. 25, 2024. https://dis-blog.thalesgroup.com/security/2017/01/25/what-is-saml-authentication-who-needs-it/ (Year: 2017).*

HEI Security. "Federal Identity, Credential, and Access Management (FICAM) Roadmap and Implementation Guidance." (Dec. 2, 2011). Retrieved online Sep. 25, 2024. https://heisecurity.com/wp-content/uploads/2020/11/FICAM_Roadmap_and_Implem_Guide.pdf (Year: 2011).*

Goodrich et al., "Notarized Federated Identity Management for Web Services", Lecture Notes in Computer Science, vol. 4127. DBSec 2006. http://cs.brown.edu/cgc/stms/papers/notarizedFIM.pdf.

Microsoft Corporation; "Federated Identity Pattern", https://msdn.microsoft.com/en-us/library/dn589790.aspx; Jun. 23, 2017. 8 pages.

* cited by examiner

SYSTEMS AND METHODS FOR FEDERATED IDENTITY MANAGEMENT

CROSS-REFERENCE TO RELATED PATENT APPLICATION

This application is a continuation of U.S. patent application Ser. No. 15/902,579, filed on Feb. 22, 2018, which is incorporated herein by reference in its entirety.

TECHNICAL FIELD

Embodiments of the present disclosure relate generally to the field of managing the distribution of personal/sensitive information.

BACKGROUND

In many situations, a third party may need information about an individual in order to provide a good or service to the individual. For example, if the individual is applying for a loan from a bank, the bank may need biographical information about the individual and financial information for the individual. To receive this information, the third party must typically request the information directly from the individual or request that the individual provide certain pieces of information that allow the third party to find the information about the individual, for example, by running a credit check on the individual. As another example, merchants typically ask customers for their information (e.g., address, name, etc.) during checkout, which many customers find invasive and bothersome. Therefore, better systems and methods for identity management are needed.

SUMMARY

One embodiment relates to a computer-implemented method. The computer-implemented method includes receiving, by a federated identity computing system, identity information from a customer; receiving, by the computing system, preferences for the identity information from the customer, wherein the preferences govern distribution of the identity information to requesting parties; generating, by the computing system, a key specific to the customer; and provisioning, by the computing system, the key to an identification chip associated with the customer. The computer-implemented method further includes receiving, by the computing system, the key and a request for one or more pieces of the identity information from a requesting party and providing, by the computing system, the requested one or more pieces of identity information to the requesting party based on the key and the preferences.

Another embodiment relates to a federated identity computing system. The federated identity computing system includes a network interface structured to communicate data over a network, a processor, and a memory coupled to the processor and comprising non-transitory machine readable storage media having instructions stored thereon. When executed by the processor, the instructions cause the federated identity computing system to receive, by the network interface, identity information from a customer; receive, by the network interface, preferences for the identity information from the customer, wherein the preferences govern distribution of the identity information to requesting parties; generate a key specific to the customer; and provision the key to an identification chip associated with the customer. When executed by the processor, the instructions further cause the federated identity computing system to receive, by the network interface, the key and a request for one or more pieces of identity information from a requesting party and provide, by the network interface, the requested one or more pieces of identity information to the requesting party based on the key and the preferences.

Another embodiment relates to a mobile device associated with a customer. The mobile device includes a network interface structured to communicate data over a network, an input/output circuit structured to receive inputs from the customer and provide outputs to the customer, a display, and an identification chip including a key associated with the customer. The mobile device also includes a processor and a memory comprising non-transitory machine readable storage media having an federated identity application stored thereon, the memory coupled to the processor, and the federated identity application including instructions executable by the processor. The instructions are structured to cause the processor to receive, by the input/output circuit, identity information from the customer; receive, by the input/output circuit, preferences for the identity information from the customer, wherein the preferences govern distribution of the identity information to requesting parties by a federated identity computing system; and transmit, by the network interface, the identity information and the preferences to the federated identity computing system. The instructions are further structured to cause the processor to receive a request for the key from a requesting party computing system and transmit, by the network interface, the key to the requesting party computing system.

DETAILED DESCRIPTION

Figure 1:
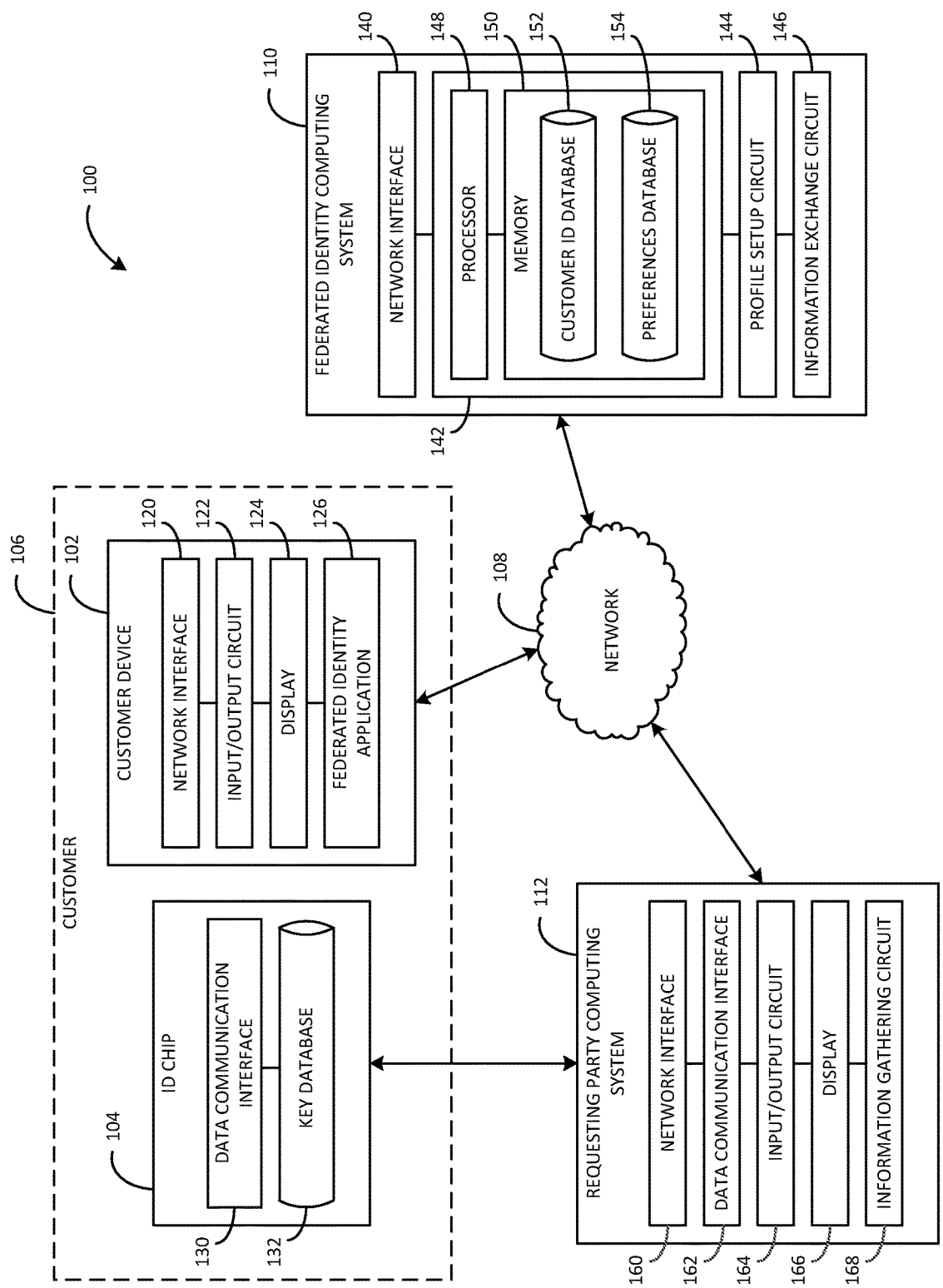
FIG. 1 is a federated identity management system, according to an example embodiment.

Referring to the Figures generally, various systems, methods, and apparatuses for federated identity management are described herein. In various embodiments, a customer creates an identity profile with a federated identity management system and registers biographical information or other personal information relating to the customer's identity to the identity profile, which is known as the "identity information" herein. For example, the customer may register the customer's social security number, address, phone number (s), email address(es), biometric information, health information, financial information, usernames and passwords, and so on with the federated identity management system. In return, the customer is provided with a chip associated with the customer's identity profile. The chip includes a key relating to the customer's identity profile. Subsequently, a third party requesting identity information for the customer (e.g., "requesting party") may communicate with the chip, which provides the requesting party with the key. The requesting party transmits the key to the federated identity management system along with a request for certain pieces of identity information about the customer, and in response, the federated identity management system provides information relating to the customer's identity, which may or may not include the requested pieces of identity information to the requesting party. Alternatively, the chip may itself store certain pieces of identity information, and the requesting party may retrieve or obtain the information by communicating directly with the chip.

Additionally, in certain arrangements, the customer may provide preferences to the federated identity management system as part of the customer's identity profile. The preferences govern the distribution of the customer's identity information to third parties (e.g., by defining what pieces of identity information may be provided to which requesting parties). For example, the customer may submit a preference that, for a requesting party that is a national merchant, only the customer's name, address, and email address may be provided to the requesting party. However, the customer may also submit a preference that, for a requesting party that is a healthcare institution, the customer's health record and full biographical information may be provided.

The systems and methods described herein for federated identity management offer a number of technical advantages over existing systems and methods for identification and authentication. Currently, receiving biographical and other personal information for a customer is often a time-consuming process, requiring the customer or a third party to manually enter information for the customer as needed. Even when information about the customer is available from a third party (e.g., a government database, a consumer credit reporting agency, etc.), certain information must still be received from the customer in order to retrieve the customer's information stored with the third party. Moreover, for certain types of transactions or processes, the customer's identifying information must be verified before the transaction or process may proceed (e.g., when the customer opens a credit card, when the customer applies for a lease, when the customer applies for a mortgage, etc.). The authentication process may also be difficult and time-consuming, requiring the party performing the authentication to, for example, pull credit history for the customer, perform a background check on the customer, and so on.

Accordingly, the systems and methods described herein offer the technical advantage of providing a federated identity management system that includes a consolidated location storing identity information for the customer. As such, parties needing identity information for the customer may request and receive the information from the federated identity management system, thereby speeding up the process of receiving such information as, for example, the information must no longer be manually entered. Moreover, in various arrangements the federated identity management system verifies that the customer's identity information is correct when it is registered with the federated identity management system such that the federated identity management system is a trusted information source. As such, the requesting party does not need to perform a further authentication process on the information received from the federated identity management system, which allows transactions between the customer and the requesting party to proceed more quickly.

Moreover, the present systems and methods may improve the functioning of the various computer systems involved in gathering information for and authenticating the information for the customer. For example, retrieving identifying information for the customer from the federated identity management system may streamline the customer information gathering processes for a computer system associated with the requesting party, thereby increasing the amount of available computer bandwidth and decreasing the number of actions the processors must process. Additionally, if the federated identity management system is a trusted information source, the computer systems do not need to perform an authentication process on the customer information, which further increases bandwidth and decreases processing actions. It also results in faster authentication and quicker recognition of the customer.

Referring now to FIG. 1, an embodiment of a federated identity management system 100 is depicted. In brief overview, the system 100 includes a customer device 102 and an identification chip ("ID chip") 104 associated with a customer 106. The customer device 102 is connected to a network 108. Additionally, the system 100 includes a federated identity computing system 110 and a requesting party computing system 112, both of which are also connected to the network 108. In reference to components of the system 100 described herein, references to the components in singular or in plural form are not intended as disclaimers of alternative arrangements unless otherwise indicated. The components are configured to interact, in various arrangements, as described in further detail below.

In the system 100, data communication between the customer device 102, the federated identity computing system 110, and the requesting party computing system 112 is via the network 108. In some arrangements, the network 108 includes the Internet. In other arrangements or combinations, the network 108 includes a local area network or a wide area network. In still other embodiments, the network 108 is a propriety network, such as a proprietary banking network with cryptography capabilities for security. The network 108 may be facilitated by short and/or long range communication technologies including Bluetooth transceivers, Bluetooth beacons, RFID transceivers, NFC transceivers, Wi-Fi transceivers, cellular transceivers, wired network connections, etc. Additionally, in various embodiments, the ID chip 104 and the requesting party computing system 112 are capable of data communication outside of the network 108, as shown in FIG. 1 and described in further detail below.

The customer device 102 is a computing device associated with the customer 106 and includes one or more circuits structured to allow the customer 106 to exchange data over the network 108, execute software applications, generate graphical user interfaces, and so on. Accordingly, the customer device 102 includes any type of computing device operated by a customer in connection with the services offered by a federated identity computing system 110, as described in further detail herein. For example, in various embodiments, the customer device 102 is a phone (e.g., a smartphone), a mobile computing device (e.g., a tablet computer, a laptop computer, a personal digital assistant, a portable gaming device), a stationary computing device (e.g., a desktop computer), or a wearable computing device (e.g., a smart watch, smart glasses, a smart bracelet).

As shown in FIG. 1, the customer device 102 includes a network interface 120, an input/output circuit 122, a display 124, and a federated identity application 126. The network interface 120 includes program logic that facilitates connection of the customer device 102 to the network 108. Accordingly, the network interface 120 supports and enables communication between the customer device 102 and other components of the system 100, such as the federated identity computing system 110.

The input/output circuit 122 is structured to receive communications from and provide communications to the customer 106 using the customer device 102. In this regard, the input/output circuit 122 is structured to exchange data, communications, instructions, etc. with an input/output component of the customer device 102. Accordingly, in one embodiment, the input/output circuit 122 may include an input/output device, such as a touchscreen, a keyboard, a microphone, or a speaker. In another embodiment, the input/output circuit 122 may include communication circuitry for facilitating the exchange of data, values, messages, and the like between an input/output device and the components of the customer device 102. In yet another embodiment, the input/output circuit 122 may include machine-readable media for facilitating the exchange of information between the input/output device and the components of the customer device 102. In still another embodiment, the input/output circuit 122 may include any combination of hardware components (e.g., a touchscreen), communication circuitry, and machine-readable media.

The display 124 may be a screen, a touchscreen, and the like. The customer device 102 may use the display 124 to communicate information to the customer 106 (e.g., by displaying the information to the user on the display 124) and/or to receive communications from the customer 106 (e.g., through a keyboard provided on a touchscreen of the display 124). In some embodiments, the display 124 may be a component of an input/output device, such as an input/output device included as part of the input/output circuit 122 as described above.

In various embodiments, the customer device 102 includes a memory comprising non-transitory machine readable storage media having the federated identity application 126 stored, or partly stored, thereon. The memory is coupled to a processor, and the federated identity application 126 includes instructions that are executable by the processor. In some arrangements, the federated identity application 126 may be a designated application running on the customer device 102 for federated identity management (e.g., the customer device 102 is a smartphone, and the federated identity application 126 is an app running on the smartphone). In other arrangements, the federated identity application 126 may be a general purpose application running on the customer device 102 through which the customer device 102 may interface with the federated identity computing system 110 (e.g., the federated identity application 126 is a web browser running on the customer device 102 through which the customer 106 accesses a website associated with the federated identity computing system 110).

The federated identity application 126 may also be provided on the customer device 102 through various mechanisms. For example, in one embodiment, the federated identity application 126 is a downloaded application (e.g., downloaded from a website via a browser application on the customer device 102, downloaded from an application store, etc.). In another embodiment, the federated identity application 126 is hard-coded into a memory of the customer device 102. In yet another embodiment, the federated identity application 126 is a server-based program (e.g., implemented through a server associated, or part of, the federated identity computing system 110).

Regardless of the implementation, the federated identity application 126 is configured to interface with and allow the customer to register an identity profile with the federated identity computing system 110 and provide identity information to the federated identity computing system 110 for inclusion in the identity profile. For example, the federated identity application 126 may receive graphical user interfaces from the federated identity computing system 110 including input fields whereby the customer 106 may input identity information for the customer 106. The federated identity application 126 may then present the graphical user interfaces to the customer 106 (e.g., via the display 124), receive the identity information from the customer 106 via the input/output circuit 122, and provide the received identity information to the federated identity computing system 110. In some arrangements, the federated identity application 126 may provide the identity information directly to the federated identity computing system 110. In other arrangements, the federated identity application 126 may indirectly provide the identity information to the federated identity computing system 110. As an example, the federated identity application 126 may receive from the customer 106 and provide to the federated identity computing system 110 usernames and passwords for the customer 106 (e.g., to social media platforms, to banking websites, etc.) that the computing system 110 can use to gather identity information for the customer 106.

The federated identity application 126 is also configured to receive preferences from the customer 106 regarding the identity profile for the customer 106 and provide the preferences to the federated identity computing system 110. The preferences may, for example, limit certain pieces or types of information that the federated identity computing system 110 provides to certain requesting parties or certain types of requesting parties (e.g., health information can only be provided to requesting parties that are healthcare institutions). In one example, the federated identity application 126 receives a request from the customer 106 to add or update preferences for the customer's identity profile. In response, the federated identity application 126 interfaces with the federated identity computing system 110 to receive graphical user interfaces including input fields whereby the customer 106 may add or update the preferences, which that the federated identity application 126 presents to the customer 106. The customer 106 then adds or updates preferences for the customer's identity profile, and the federated identity application 126 transmits the received preferences to the federated identity computing system 110. In another example, the federated identity application 126 presents graphical user interfaces relating to preferences for the identity information of the customer 106 as part of setting up an identity profile for the customer 106.

After the customer 106 registers an identity profile with the federated identity computing system 110, the customer 106 is provided with the ID chip 104. In various arrangements, an identity services provider associated with the federated identity computing system 110 provides the chip to the customer 106. The identity services provider may be a financial institution (e.g., a bank, a card network, etc.), a government institution, an independent third party, and so on. The customer 106 may receive the ID chip 104 in-person (e.g., by visiting a brick-and-mortar location associated with the federated identity computing system 110), through the mail (e.g., the federated identity computing system 110 has the ID chip 104 configured and mailed to the customer 106), etc. Furthermore, the ID chip 104 may be implantable in the customer 106, insertable or usable with a device associated with the customer 106 (e.g., the customer device 102), and so on. Regardless of the implementation, the ID chip 104 has a key stored thereon that is associated with the identity profile for the customer 106. Accordingly, once the customer 106 is in possession of the ID chip 104, a requesting third party (e.g., associated with the requesting party computing system 112) may transmit a request for the key to the ID chip 104 and, in response, receive the key from the ID chip 104.

The ID chip 104 is one or more electronic circuits (e.g., an integrated circuit(s)) on a piece of semiconductor material. For example, the ID chip 104 may be a microchip or another small/tiny integrated circuit disposed on or with the semiconductor material. The ID chip 104 may be disposed in a protective housing (e.g., a fob) or exposed (e.g., when implanted in the user, which may also mean that the chip includes bio-safe materials). In various embodiments, the ID chip 104 also includes a module that stores computer memory or provides logic circuitry for one or more microprocessors included with the chip. Additionally, the ID chip 104 may be an analog chip, a digital chip, or a mixed chip with analog and digital components. As will be appreciated by those of skill in the art, the exact size and shape of the chip 104 is highly configurable (e.g., square-shaped, circular-shaped, less than one-square inch, more than one-square inch in size, etc.). All such variations are intended to fall within the scope of the present disclosure.

As shown in FIG. 1, the ID chip 104 includes a data communication interface 130 and a key database 132. In various embodiments, the data communication interface 130 is configured to facilitate the exchange of data directly (i.e., without using the network 108) between the ID chip 104 and a corresponding data communication interface 162 incorporated as part of the requesting party computing system 112. As such, the data communication interface 130 may include any hardware and associated logics that allow for close or local data communication, such as a device or circuit enabling near field communication ("NFC"), radio-frequency identification ("RFID"), Bluetooth, and so on. The data communication interface 130 may only allow for close or local data communication to ensure, for example, that only requesting parties that the customer 106 has authorized to request identity information for the customer 106 are able to request the key from the ID chip 104 (e.g., because it is unlikely that a non-authorized requesting party would be able to get close enough to the ID chip 104 to receive the key). In other embodiments, however, the data communication interface 130 may additionally or alternatively facilitate the exchange of data using the network 108 (e.g., the data communication interface 130 may instead be a network interface similar to the network interface 120). Additionally, in some arrangements, the data communication interface 130 may instead be incorporated as part of a device to which the ID chip 104 is coupled. For example, the ID chip 104 may be incorporated into the customer device 102, and the data communication interface 130 may be a functionality of the customer device 102.

The key database 132 is configured to retrievably store a key associated with the customer's identity profile. The key is a unique identifier associated with the identity profile. In various embodiments, the key is a string of characters. For example, the key may be a string of alphanumeric characters, a string of pure numeric characters, a passcode (e.g., that is set up by the customer 106), other types of characters, and so on. In some embodiments, the key is static. For example, the key is provisioned onto the ID chip 104 when the ID chip 104 is configured and provided to the customer and does not subsequently change. In other embodiments, the key is periodically updated, modified, changed, etc. (i.e., dynamically changing based on at least one a predefined amount time, one or more events (e.g., after a predefined number of transmissions of the key to a requesting party), or a combination thereof). As an example, an enterprise key management system periodically updates the key stored in the key database 132 (e.g., whenever the customer 106 brings the ID chip 104 near a data communication interface corresponding to the enterprise key management system, because the data communication interface 130 allows for data communication over the network 108 and the enterprise key management system updates the key via the network 108, etc.). In still other embodiments, the key is generated when the ID chip 104 receives a request for biographical information from the requesting party computing system 112 (e.g., the ID chip 104 includes a circuit configured to generate an encrypted key in response to the request, which the federated identity computing system 110 can decrypt).

As noted above, in response to a request from the requesting party computing system 112, the ID chip 104 is configured to provide the key to the requesting party computing system 112. In certain embodiments, the ID chip 104 may also implement an authorization measure before transmitting the key to the requesting party computing system 112 to ensure that only third parties that the customer 106 has authorized to request identity information for the customer 106 receive the key. As an illustration, in one arrangement and as noted above, the authorization measure may be that the ID chip 104 only allows the key to be transmitted via NFC, as it is unlikely that a non-authorized requesting party would be able to come close enough to the ID chip 104 to receive the key at the requesting party computing system 112 via NFC. In another arrangement, the ID chip 104 may be incorporated into the phone of the customer 106 (e.g., the customer device 102) and trigger an authorization process via the phone. For example, in response to receiving an information request from the requesting party computing system 112, the ID chip 104 triggers an authentication program on the phone (e.g., implemented through the federated identity application 126 of the customer device 102) through which the customer 106 must enter a personal identification number ("PIN"), enter a password, or provide a biometric to the phone. The ID chip 104 only provides the key to the requesting party computing system 112 if the phone transmits an indication to the ID chip 104 confirming that the customer 106 has been authenticated.

Moreover, in certain embodiments, the key database 132 may further store certain identity information for the customer 106. For example, the key database 132 may store less sensitive identity information about the customer 106, such as the customer's email address and phone number. The requesting party computing system 112 may thus request and receive identity information directly from the ID chip 104, rather than having to transmit the key to and receive the identity information from the federated identity computing system 110. In some arrangements, the ID chip 104 may only transmit the identity information to the requesting party computing system 112 if the information request received from the requesting party computing system 112 is authenticated by the customer 106 in the manner described above.

The federated identity computing system 110 is associated with an identity services provider, which may be a financial institution (e.g., a bank, a card network, etc.), a government institution, an independent third party, and so on. As described in further detail below, the federated identity computing system 110 is configured to provide identity management services to various customers, such as customer 106. Additionally, the federated identity computing system 110 is configured to provide identity information registered by various customers to requesting parties. In operation, the federated identity computing system 110 may include server computer systems, for example, comprising one or more networked computer servers together having at least a processor and non-transitory machine readable media with instructions stored thereon.

As shown in FIG. 1, the federated identity computing system 110 includes a network interface 140, a processing circuit 142, a profile setup circuit 144, and an information exchange circuit 146. The network interface 140 includes program logic that facilitates connection of the federated identity computing system 110 to the network 108. Accordingly, the network interface 140 supports and enables communication between the federated identity computing system 110 and other components of the system 100, such as the customer device 102 and the requesting party computing system 112.

The processing circuit 142 includes at least one processor 148 and a memory 150. As shown in FIG. 1, the memory 150 includes a customer ID database 152 and a preferences database 154. The customer ID database 152 is configured to retrievably store identifying information received from various customers, such as customer 106, in connection with identity profiles held by the customers with the federated identity computing system 110. For example, the customer ID database 152 may store identity information including biographical information (e.g., an address, a birthday, a social security number, educational history, employment history, etc.), contact information (e.g., phone number, email address(es), etc.), account information (e.g., usernames and passwords for health accounts, financial accounts, etc.), health information (e.g., a health history), financial information (e.g., credit scores, net wealth information, etc.), biometric information, (e.g., fingerprint templates, voice templates, etc.), and so on.

The preferences database 154 is configured to retrievably store preferences information received from various customers, such as customer 106, in connection with identity profiles held by the customers with the federated identity computing system 110. Accordingly, in various embodiments, the preferences database 154 may store preferences limiting the circumstances under which the federated identity computing system 110 may provide certain pieces or types of identity information to the requesting party computing system 112 (e.g., by limiting the dispensing of a certain type of identity information to a certain requesting party to a certain type of requesting party). As an example, the preferences database 154 may store a preference that the federated identity computing system 110 only provide health information to requesting parties that are healthcare institutions. As another example, the preferences database 154 may store a preference that a healthcare institution unaffiliated with the customer 106 (e.g., a healthcare institution that the customer 106 has never visited, determined based on health history information stored in the customer ID database 152) may only receive the address information for the customer 106 but that affiliated healthcare institutions may receive any information. As a third example, the preferences database 154 may store a preference that, in response to receiving a request for the social security number of the customer 106, the federated identity computing system 110 authorize the request with the customer 106 (e.g., by having the customer 106 provide a confirmation text or email to the federated identity computing system 110 via the customer device 102) before providing the social security number to the requesting party. As a fourth example, the preferences database 154 may store a preference that national merchants may receive the address and email address for the customer 106 but that local merchants may not receive any identity information for the customer 106. Some identity information is provided to all requesting parties, while other identity information has more security associated therewith to prevent widespread dispersal.

The profile setup circuit 144 is configured to facilitate the customer 106 in registering an identity profile with the federated identity computing system 110. Accordingly, in various embodiments, the profile setup circuit 144 is configured to interface with the federated identity application 126 on the customer device 102 and thereby receive a request from the customer 106 to set up an identity profile. In some embodiments, in response to receiving a request for an identity profile, the profile setup circuit 144 interfaces with the federated identity application 126 to request certain prerequisite pieces of identity information from the customer 106. For example, the profile setup circuit 144 may transmit graphical user interfaces to the federated identity application 126 requesting that the customer 106 input his/her name, address, birthday, phone number, and email address via the customer device 102 in order to register an identity profile, and the profile setup circuit 144 creates an identity profile for the customer 106 using those pieces of information. As another example, the profile setup circuit 144 may transmit graphical user interfaces to the federated identity application 126 requesting that the customer 106 input certain identifying information via the federated identity application 126, such as the name, birthday, and social security number for the customer 106, which the profile setup circuit 144 uses to identify additional identity information about the customer 106 for registering an identity profile for the customer 106 (e.g., by running a background or credit check on the customer 106). As a third example, the profile setup circuit 144 may transmit graphical user interfaces to the federated identity application 126 including a number of fields for pieces of identity information, and the customer 106 may choose which fields to complete. The profile setup circuit 144 then receives the inputted information and registers an identity profile for the customer 106 using the completed fields. Alternatively, in each of the above examples, the federated identity application 126 may generate graphical user interfaces to display to the customer 106 in order to register a profile (e.g., in response to a request from the customer to register a profile), and the federated identity application 126 then transmits inputted information to the profile setup circuit 144. Once the profile setup circuit 144 receives identity information for the customer 106, the profile setup circuit 144 is configured to store the identity information in the customer ID database 152 in association with the identity profile.

In some embodiments, the profile setup circuit 144 is additionally configured to verify that the received identity information for the customer 106 is correct by, for example, running a credit check on the customer 106, verifying that the entered identifying information matches information for the customer 106 stored in government databases, requiring the customer 106 to verify the identifying information (e.g., by sending an email to the entered email address and having the customer 106 click on a link to confirm that the email address is correct), and so on. Accordingly, confirming that identity information received from the customer 106 is correct before storing the identity information in the customer ID database 152 may allow the federated identity computing system 110 to maintain a status as a trusted source for identity information. In some embodiments, if the profile setup circuit 144 is unable to confirm the veracity of a piece of identity information, the profile setup circuit 144 is configured to alert the customer 106.

Additionally, the profile setup circuit 144 is configured to allow the customer 106 to provide preferences for the various pieces of identity information stored in the customer ID database 152. Accordingly, in various embodiments, the profile setup circuit 144 is configured to transmit graphical user interfaces to the federated identity application 126 including input fields that the customer 106 may use to indicate preferences for various pieces of provided identity information. Preferences may include which requesting parties are allowed to access which pieces of identity information, under what circumstances (e.g., based on the time of the request, the date of the request, the location the request is coming from, etc.) the federated identity computing system 110 may provide a piece of identity information, whether the customer 106 would like the federated identity computing system 110 to confirm a request for a certain piece of identity information with the customer 106 before providing the piece of identity information to the requesting party, and so on. Once the profile setup circuit 144 receives one or more preferences from the customer 106, the profile setup circuit 144 is configured to retrievably store the preference(s) in the preferences database 154 in association with the piece(s) of identity information to which the preference(s) relate.

Once the profile setup circuit 144 has registered an identity profile for the customer 106, the profile setup circuit 144 is configured to coordinate with an ID chip provider to provide the ID chip 104 to the customer 106. Accordingly, in various embodiments, the profile setup circuit 144 is configured to generate a key for the customer 106. For example, the profile setup circuit 144 may generate a random number to serve as a key for the customer 106. As another example, the profile setup circuit 144 may use an algorithm to generate a key for the customer 106 (e.g., based on a piece of identity information, such as a social security number, unique to the customer 106). Alternatively, in some embodiments, the key may be generated by a third party, such as an enterprise key management system, in response to a request from the profile setup circuit 144 and then provided to the profile setup circuit 144 by the third party.

In various embodiments, once the key is generated, the profile setup circuit 144 stores the key in association with the identity profile for the customer 106 (e.g., in association with the identity information stored for the customer 106 in the customer ID database 152 and the preferences stored for the customer 106 in the preferences database 154). The profile setup circuit 144 also communicates with the ID chip 104 to store the key in the key database 132 of the ID chip 104. As an example, the federated identity computing system 110 may be associated with an identity services provider with local branches that keep a store of ID chips. Thus, to obtain the ID chip 104, the customer 106 visits a local branch of the identity services provider, and an employee at the local branch uses a computing system at the local branch to receive the key from the profile setup circuit 144 and provision the key to the ID chip 104 (e.g., using NFC or another transmission means). As a second example, once the profile setup circuit 144 registers an identity profile for the customer 106, the profile setup circuit 144 provides instructions for creating the ID chip 104 to an ID chip center. The ID chip center is a location that processes ID chips for the federated identity computing system 110 and may be incorporated as part of the identity services provider or exist as a third party. The ID chip center then creates the ID chip 104 (e.g., by provisioning the key to an ID chip in stock at the ID chip center) and mails the ID chip 104 to the customer 106.

As another alternative, the key may be generated by the ID chip 104 itself (e.g., at the time the ID chip 104 receives a request for the key from the requesting party computing system 112). The ID chip 104 may then provide the key to the federated identity computing system 110 (e.g., via the network 108), or the ID chip 104 may generate the key in such a way that the federated identity computing system 110 is able to identify the customer 106 from the key itself (e.g., because an algorithm used to generate the key is known to the federated identity computing system 110).

Once the profile setup circuit 144 has registered a profile for the customer 106, the profile setup circuit 144 also allows the customer 106 to add additional pieces of identity information and preferences to the identity profile via the federated identity application 126. As an illustration, the profile setup circuit 144 may interface with the federated identity application 126 to provide the customer 106 with graphical user interfaces including various input fields that the customer 106 may use to enter identity information directly (e.g., by inputting the identity information into the input field) or indirectly (e.g., by inputting a username and password into the input that the profile setup circuit 144 may use to gather identity information about the customer 106). The profile setup circuit 144 may also display, via the federated identity application 126, the pieces of identity information that the customer 106 has entered into identity profile along with input fields allowing the customer 106 to add or modify preferences for the various pieces of identity information. Additionally, in various embodiments, the profile setup circuit 144 may allow the customer 106 to modify or delete pieces of identity information and/or preferences in a similar manner via the federated identity application 126.

The information exchange circuit 146 is configured to receive and process a request for identity information for the customer 106. As such, the information exchange circuit 146 is configured to receive a request for identity information from the requesting party computing system 112, the request including the key that identifies the customer 106. Once the information exchange circuit 146 has received such a request, the information exchange circuit 146 is configured to identify the customer 106 from the key and determine which pieces of identity information the customer ID database 152 has stored for the customer 106.

In some embodiments, the request includes specific pieces of identity information the requesting party computing system 112, on behalf of the requesting party, would like to receive. Accordingly, the information exchange circuit 146 is configured to determine whether the requested identity information is stored in the customer ID database 152. If a given piece of identity information is stored in the customer ID database 152, the information exchange circuit 146 is further configured to determine whether one or more preferences for the identity information are stored in the preferences database 154. If one or more preferences exist for the given piece of identity information, the information exchange circuit 146 is configured to determine whether the request meets the preference(s). Accordingly, in various embodiments, the information exchange circuit 146 is configured to gather additional information about the request and/or the requesting party to determine if the preferences are met. For example, the information exchange circuit 146 may determine the identity of the requesting party (e.g., whether the requesting party is a national merchant, a healthcare institution, an individual, etc.), the reasons for the request (e.g., for financial reasons, for healthcare reasons, etc.), the circumstances of the request (e.g., the time and date of the request, the location of the requesting party computing system 112, etc.), and so on. As an illustration, the customer 106 may have a preference that health history information only be provided to healthcare institutions. As such, when the information exchange circuit 146 receives a request for the health history information for the customer 106, the information exchange circuit 146 is configured to confirm the identity of the requesting party (e.g., by requiring that the requesting party computing system 112 sign the request with the requesting party's private key, by requiring that the requesting party computing system 112 answer security questions, etc.). Alternatively, if required by the preferences, the information exchange circuit 146 communicate with the customer 106 (e.g., via the customer device 102) to verify that the customer 106 has authorized the dispersal of the requested identity information.

In other embodiments, the request may include just the key for the customer 106. The information exchange circuit 146 is accordingly configured to use the key to identify the customer 106 and which pieces of identity information are stored for the customer in the customer ID database 152. The information exchange circuit 146 then determines whether the preferences submitted by the customer 106 are met by the request and/or the requesting party. Subsequently, the information exchange circuit 146 is configured to transmit an indication of which pieces of identity information are available for request by the requesting party computing system 112 (e.g., the information exchange circuit 146 transmits a graphical user interface indicating to the requesting party that the requesting party may only receive the address, phone number, and/or email for the customer 106 based on the preferences). The information exchange circuit 146 then receives a selection from the requesting party computing system 112.

If a given piece of identity information is stored in the customer ID database 152, and either no preferences exist for the piece of identity information or the preference(s) are satisfied, the information exchange circuit 146 is configured to provide the piece of identity information to the requesting party computing system 112. For example, the information exchange circuit 146 may provide the identity information to the requesting party computing system 112 via a secure channel or an encrypted message. If the given piece of requested identity information is not stored in the customer ID database 152, or the preference(s) for the identity information are not met, the information exchange circuit 146 is configured to deny the request from the requesting party computing system 112. For example, the information exchange circuit 146 may provide the requesting party computing system 112 with an error message indicating that the identity information is not stored in the federated identity computing system 110 or indicating that the requesting party is prohibited from receiving the requested piece of identity information.

As an illustration of the above steps, the requesting party computing system 112 requests the key associated with the customer's identity profile from the ID chip 104. The requesting party 112 receives the key from the ID chip 104 and transmits the key along with a request for one or more pieces of the customer's identity information to the federated identity computing system 110. The federated identity computing system 110 receives the key with the request for identity information. The information exchange circuit 146 then determines if the requested identity information is actually stored in the customer ID database 152 and, if it is, whether the preferences associated with the requested identity information allow for the dispersal of the identity information. Assuming that the requested identity information is stored in the customer ID database 152 and that the preferences allow for the dispersal, the information exchange circuit 146 then provides the requested piece(s) of identity information to the requesting party computing system 112.

Additionally, in various embodiments, the information exchange circuit 146 is configured to receive a payment from the requesting party computing system 112 in exchange for providing the identity information to the requesting party computing system 112. For example, the information exchange circuit 146 may charge a fee per request. Alternatively, or additionally, the information exchange circuit 146 may charge a subscription fee for the service. As another example, the information exchange circuit 146 may ask for donations in exchange for fulfilling identity information requests.

The requesting party computing system 112 is associated with a requesting party. The requesting party may be any third party who wishes to receive identity information for the customer 106, such as an individual, a company, or an organization (e.g., merchants, healthcare providers, government agencies, etc.). As such, the requesting party computing system 112 is configured to receive the key for the customer 106 from the ID chip 104 and submit the key with a request for identifying information about the customer 106 to the federated identity computing system 110. The requesting party computing system 112 is also configured to receive identifying information for the customer 106 from the federated identity computing system 110. In operation, the requesting party computing system 112 may include server computer systems, for example, comprising one or more networked computer servers together having at least a processor and non-transitory machine readable media with instructions stored thereon. Alternatively, in operation, the requesting party computing system 112 may be structured similarly to the customer device 102 and may accordingly be a phone, a mobile computing device, a stationary computing device, or a wearable computing device.

As shown in FIG. 1, in various embodiments, the requesting party computing system 112 includes a network interface 160, a data communication interface 162, an input/output circuit 164, a display 166, and an information gathering circuit 168. However, in other embodiments, the requesting party computing system 112 may include more, fewer, or different components. For example, in one embodiment, the requesting party computing system 112 may not include an input/output circuit 164 and a display 166 for communicating with a user. Instead, the requesting party computing system 112 may instead submit a pre-programmed, standardized request to the federated identity computing system 110 for identity information for the customer 106 in response to receiving the key for the customer 106 from the ID chip 104.

The network interface 160 includes program logic that facilitates connection of the requesting party computing system 112 to the network 108. Accordingly, the network interface 160 supports and enables communication between the requesting party computing system and other components of the system 100, such as the federated identity computing system 110.

In various embodiments, the data communication interface 162 is configured to facilitate the exchange of data directly (i.e., without using the network 108) between the requesting party computing system 112 and the corresponding data communication interface 130 incorporated as part of the ID chip 104. As such, the data communication interface 162 is configured similarly to the data communication interface 130 discussed above. For example, the data communication interface 162 may include any hardware and associated logics that allow for close or local data communication, such as a device or circuit enabling NFC communication, RFID communication, Bluetooth communication, and so on. However, in some embodiments, the requesting party computing system 112 may not include the data communication interface 162 and instead receive the key from the ID chip 104 via long-range communication methods, such as via the network interface 160 and the network 108.

The input/output circuit 164 is structured to receive communications from and provide communications to a user (e.g., the requesting party or an employee of the requesting party). In this regard, the input/output circuit 164 is structured to exchange data, communications, instructions, etc. with an input/output component of the requesting party computing system 112. Accordingly, various of embodiments of the input/output circuit 164 may be structured similarly to the embodiments of the input/output circuit 122 of the customer device 102 discussed above.

The display 166 may be a screen, a touchscreen, and the like. Similar to the display 124 of the customer device 102, the requesting party computing system 112 may use the display 166 to communicate information to a user (e.g., by displaying the information to the user on the display 166) and/or to receive communications from the user (e.g., through a keyboard provided on a touchscreen of the display 166). In some embodiments, the display 166 may be a component of an input/output device, such as an input/output device included as part of the input/output circuit 164 as described above.

The information gathering circuit 168 is configured to carry out requests for identity information regarding one or more customers. For example, a requesting party may provide a command to the requesting party computing system 112 (e.g., via the input/output circuit 164) to gather certain identity information about the customer 106. In response to the command, the information gathering circuit 168 is configured to establish a communication session with the ID chip 104 via the data communication interface 162. Either automatically or if the customer 106 authorizes the transmittal of the key, as discussed above, the information gathering circuit 168 thereby receives the key for the customer 106 from the ID chip 104. The information gathering circuit 168 then transmits the key to the federated identity computing system 110 along with a request for the certain identity information about the customer 106. If part or the entirety of the request is approved (e.g., because the federated identity computing system 110 has the requested identity information stored and the customer 106 has not submitted any preferences that prohibit the transmittal of the requested identity information, as discussed above), the information gathering circuit 168 receives the approved identity information.

Alternatively, the information gathering circuit 168 may receive certain identity information from the ID chip 104. For example, as discussed above, the ID chip 104 may store less sensitive identity information about the customer 106. Accordingly, when the information gathering circuit 168 receives an instruction to retrieve identity information for the customer 106, the information gathering circuit 168 transmits a request for the identity information along with a request for the key to the ID chip 104. If the ID chip 104 has any of the requested identity information stored for the customer 106, the ID chip 104 may transmit the identity information to the information gathering circuit 168 depending on the preferences.

As an illustration of the above process, a requesting party may be a merchant who wishes to retrieve information about customers for marketing and promotion purposes. As such, when a customer makes a purchase from the merchant, the merchant may request that the customer provide identifying information, such as an email, address, and telephone number, so that the merchant may notify the customer of upcoming sales and promotions. Rather than manually providing the merchant with the information, the customer 106 provides the merchant with the ID chip 104 (e.g., provided on the customer's smartphone), and the merchant uses the requesting party computing system 112 (e.g., a point-of-sale device configured to communicate with the customer's smartphone using RFID) to retrieve the customer's key. The merchant then uses the requesting party computing system 112 to transmit a request for the customer's email, address, and telephone number, along with the key, to the federated identity computing system 110. If the federated identity computing system 110 has the customer's email, address, and telephone number stored, and there are no customer preferences that prohibit the dispersal of this information, the federated identity computing system 110 transmits the requested information to the requesting party computing system 112. The merchant may then store the information in a database and use the information to market to the customer.

As another illustration of the above process, a requesting party may be a banking institution with which a customer wishes to take out a loan. The banking institution needs certain personal information about the customer in order to decide whether to approve the loan, and as such, the customer provides the ID chip 104 to the banking institution. An employee of the banking institution then uses the requesting party computing system 112 to retrieve the customer's key from the ID chip 104 and submit the key with a request for certain identity information about the customer (e.g., the customer's address, phone number, employment history, financial history, etc.) to the federated identity computing system 110. If the federated identity computing system 110 has the requested identity information stored, and no customer preferences prohibit the dispersal of the requested identity information, the federated identity computing system 110 transmits the requested identity information to the requesting party computing system 112. The banking institution may then use the received identity information to check the customer's credit and employment history and determine whether to approve the customer for the loan.

As a third illustration of the above process, a requesting party may be a state department of motor vehicles (DMV). A customer may need to submit personal information, including an address, a phone number, and biographical information, to the DMV as part of an application for a driver's license. As such, the customer may provide the ID chip 104 to an employee of the DMV, and the employee may use the requesting party computing system 112 to retrieve the customer's key from the ID chip 104. The employee may then submit the key with a request for the necessary personal information to the federated identity computing system 110. If the federated identity computing system 110 has the requested personal information stored, and no customer preferences prohibit the dispersal of the requested personal information, the federated identity computing system 110 transmits the requested personal information to the requesting party computing system 112. The DMV employee may then use the received personal information to process the customer's application for a driver's license.

Figure 2:
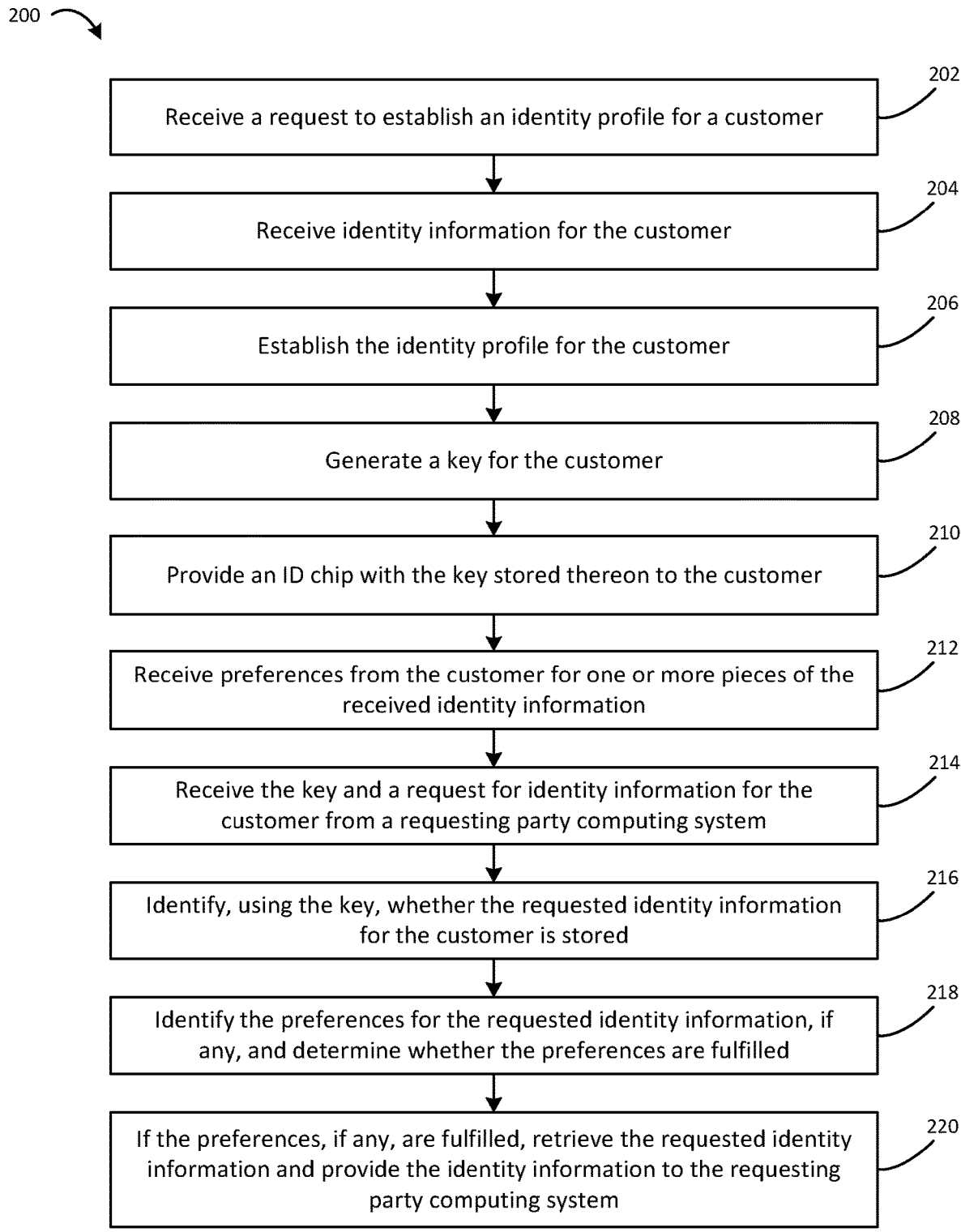
FIG. 2 is a flow diagram illustrating a process of registering an identity profile for a customer and providing identity information about the customer to a requesting party, according to an example embodiment.

Referring now to FIG. 2, a flow diagram of a method 200 of registering an identity profile for the customer 106 and providing identity information to a requesting party is shown, according to an example embodiment. To begin with, at process 202, the federated identity computing system 110 receives a request to establish an identity profile for the customer 106. At process 204, the federated identity computing system 110 receives identity information for the customer 106. For example, in one embodiment, the federated identity computing system 110 receives an indication from the customer 106, via the customer device 102, that the customer 106 would like to establish an identity profile. In response, the federated identity computing system 110 interfaces with the customer device 102 to provide graphical user interfaces to the customer 106 including input fields for the customer 106 to enter identity information. As discussed above, in various embodiments, the customer 106 may provide the identity information directly (e.g., by providing the identity information directly in an input field) or indirectly (e.g., by providing information, such as a username and password, that the federated identity computing system 110 may use to gather identity information for the customer 106) to the federated identity computing system 110. Alternatively, in some embodiments, the federated identity computing system 110 receives the request for the identity profile at the same time as the identity information about the customer 106.

Once the federated identity computing system 110 receives the identity information, at process 206, the federated identity computing system establishes or creates the identity profile for the customer 106 including the received identity information for the customer 106. In some embodiments, the federated identity computing system 110 may verify the identity information about the customer 106 before adding the identity information to the identity profile for the customer 106. For example, as discussed above, the federated identify computing system 110 may verify the submitted identity information against information for the customer 106 stored with a third party (e.g., stored in a government database) or ask the customer 106 to confirm the submitted identity information.

At process 208, the federated identity computing system 110 generates a key for the customer 106. For example, as discussed above, the federated identity computing system 110 generates a key as a random number, using an algorithm, and so on. Alternatively, the key may be generated by a third party and provided to the federated identity computing system 110. At process 210, an identification chip (e.g., the ID chip 104) with the key stored therein is provided to the customer 106. As an example, as discussed above, the customer 106 may receive the ID chip 104 at a local branch of an identity services provider associated with the federated identity computing system 110, from an ID chip center associated with the federated identity computing system 110, and so on. As an alternative to processes 208 and 210, the identification chip may be provided to the customer 106 without a specific key stored thereon and later generate the key (e.g., using an algorithm known to the ID chip 104 and the federated identity computing system 110) or have the key later provisioned thereon by an enterprise key management system.

At process 212, the federated identity computing system 110 receives preferences from the customer 106 regarding one or more pieces of the received identity information. Accordingly, in various embodiments, the federated identity computing system 110 interfaces with the customer device 102 to display graphical user interfaces to the customer 106 whereby the customer 106 may input preferences for submitted identity information. For example, the graphical user interfaces may show the pieces of identity information the customer 106 has submitted to the federated identity computing system 110 along with input fields for selecting preferences limiting when the federated identity computing system 110 may dispense the pieces of identity information. In some embodiments, the graphical user interfaces alternatively allow the customer 106 to input preferences for the pieces of identity information at the time the customer 106 submits the identity information (e.g., at process 204).

At process 214, the federated identity computing system 110 receives the key and a request for identity information for the customer 106 from the requesting party computing system 112. At process 216, the federated identity computing system 110 identifies, using the key, whether the requested identity information for the customer 106 is stored in the federated identity computing system 110. For example, the customer ID database 152 of the federated identity computing system 110 may store an index associating various keys with pieces of identity information for various customers. The federated identity computing system 110 thus uses the received key and the index to identify which pieces of identity information are stored for the customer 106 in the customer ID database 152.

At process 218, the federated identity computing system 110 identifies stored preferences (if any) for the requested identity information. As an example, the preferences database 154 may include an index associating pieces of identity information stored in the customer ID database 152 with preferences stored in the preferences database 154. Thus, the federated identity computing system 110 uses the index to identify whether the customer 106 has submitted a preference for a given piece of identity information. If the customer 106 has submitted a preference for the given piece of identity information, at process 218, the federated identity computing system 110 further determines whether the preference is fulfilled. In some arrangements, the federated identity computing system 110 may request additional information from the requesting party computing system 112 and/or the customer 106 (e.g., via the customer device 102) in determining whether a given preference is fulfilled. For example, if a preference specifies that the customer 106 should confirm the request before the identity information is dispensed, the federated identity computing system 110 may send a notification to the customer device 102 (e.g., as a text message, an email, etc.) asking the customer 106 to confirm the request. Additionally, in some arrangements, the federated identity computing system 110 may verify certain information about the request and/or the requesting party associated with the requesting party computing system 112 in determining whether a given preference is fulfilled. As an illustration, if a preference specifies that the identifying information may only be dispensed to a certain type of requesting party (e.g., insurers, healthcare institutions, etc.), the federated identity computing system 110 may verify the identity of the requesting party by, for example, determining whether the request for identity information was encrypted with a private key for the requesting party. At process 220, if the preferences (if any) for the requested identifying information are fulfilled, the federated identity computing system 110 retrieves the requested identity information and provides the requested identity information to the requesting party computing system 112.

Alternatively, in some arrangements, the processes 216, 218, and 220 may occur in a different order. For example, the federated identity computing system 110 may receive just the key for the customer 106 from the requesting party computing system 112 and identify the pieces of identity information stored for the customer 106 in the customer ID database 152 using the key. The federated identity computing system 110 may then identify the preferences for the stored identity information and determine which preferences are met by the request and the requesting party, as discussed above. Subsequently, the federated identity computing system 110 may interface with the requesting party computing system 112 to show the requesting party only the types of identity information that the requesting party is eligible to request as per the preferences of the customer 106. The requesting party computing system 112 submits the pieces of identity information that the requesting party would like to request, and the federated identity computing system 110 retrieves those pieces of identity information and submits them to the requesting party computing system 112.

Figure 3:
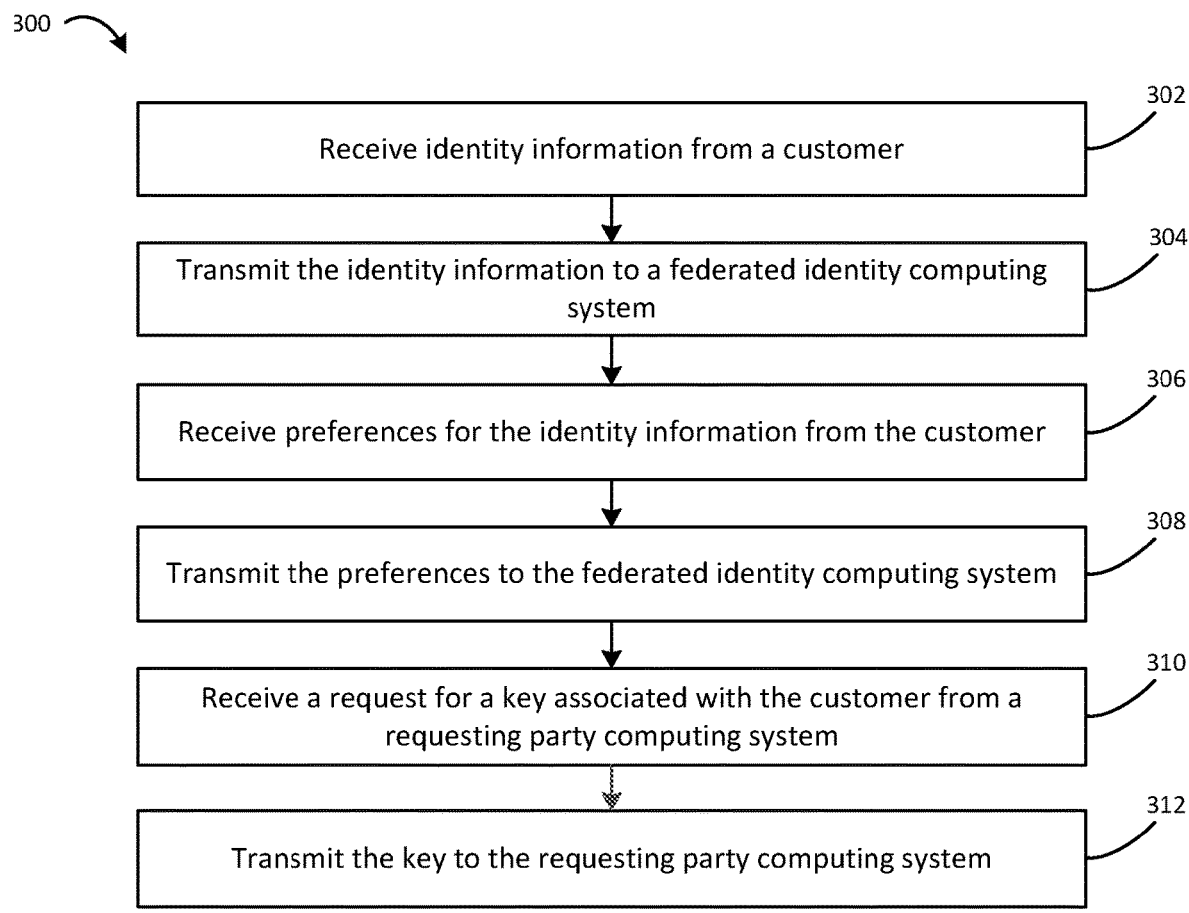
FIG. 3 is a flow diagram illustrating a process of managing an identity profile held by the customer, according to an example embodiment.

Referring now to FIG. 3, a method 300 of managing an identity profile held by the customer is shown, according to an example embodiment. At process 302, the customer device 102 receives identity information from the customer 106. As an example, the customer device 102 displays graphical user interfaces received from the federated identity computing system 110 that include input fields whereby the customer 106 may input identity information either directly or indirectly. At process 304, the customer device 102 then transmits the identity information received from the customer 106 to the federated identity computing system 110.

Similarly, at process 306, the customer device 102 receives preferences for the identity information from the customer 106. In one example, the customer device 102 displays graphical user interfaces received from the federated identity computing system 110 including identity information already received from the customer 106 and input fields whereby the customer 106 may input preferences for the received identity information. In another example, the customer device 102 displays graphical user interfaces received from the federated identity computing system 110 include input fields for identity information along with input fields for preferences. Accordingly, at process 308, the customer device 102 transmits the preferences to the federated identity computing system 110.

In some arrangements, the processes 302, 304, 306, and 308 may occur as the customer 106 is registering an identity profile with the federated identity computing system 110. In other arrangements, the processes 302, 304, 306, and 308 may occur after the customer 106 has already registered an identity profile with the federated identity computing system 110 and as the customer 106 is instead adding identity information and preferences to the identity profile.

As discussed above, in some embodiments, the ID chip 104 may be incorporated into the customer device 102 and, for example, managed by the federated identity application 126. As such, at process 310 of the method 300, the customer device 102 receives a request for the key associated with the customer 106 from the requesting party computing system 112 (e.g., via NFC, via RFID, via Bluetooth, via the network 108, etc.). In response, at process 312, the customer device 102 with the ID chip 104 transmits the key to the requesting party computing system 112. In some arrangements, the customer device 102 with the ID chip 104 may first require the customer 106 to authorize the transmittal of the key. For example, the customer 106 may enter a PIN number or password via the display 124, enter biometric information through the customer device 102 (e.g., a fingerprint scan, a voice print, etc.), and so on to authorize the transmittal of the key. The customer device 102 then verifies the PIN number, password, biometric information, etc. against template information for the customer 106 stored on the customer device 102 or on a database (e.g., the customer ID database 152).

In certain arrangements, the ID chip 104 may store certain identity information for the customer 106. For example, the customer 106 may indicate that certain identity information is less sensitive, and the customer device 102 may accordingly store that identity information on the ID chip 104 once received. Accordingly, in such arrangements, the customer device 102 with the ID chip 104 may transmit stored identity information that is requested by the requesting party computing system 112 along with or instead of the key. For example, if the requesting party computing system 112 indicates in the request for the key that the requesting party computing system 112 will use the key to request the email for the customer 106 from the federated identity computing system 110, the customer device 102 with the ID chip 104 may transmit an email stored on the ID chip 104 instead of the key.

It should be understood, however, that in other embodiments, the ID chip 104 may not be incorporated as part of the customer device 102. Instead, the ID chip 104 may perform processes 310 and 312 independently or with the assistance of a different device.

Figure 4:
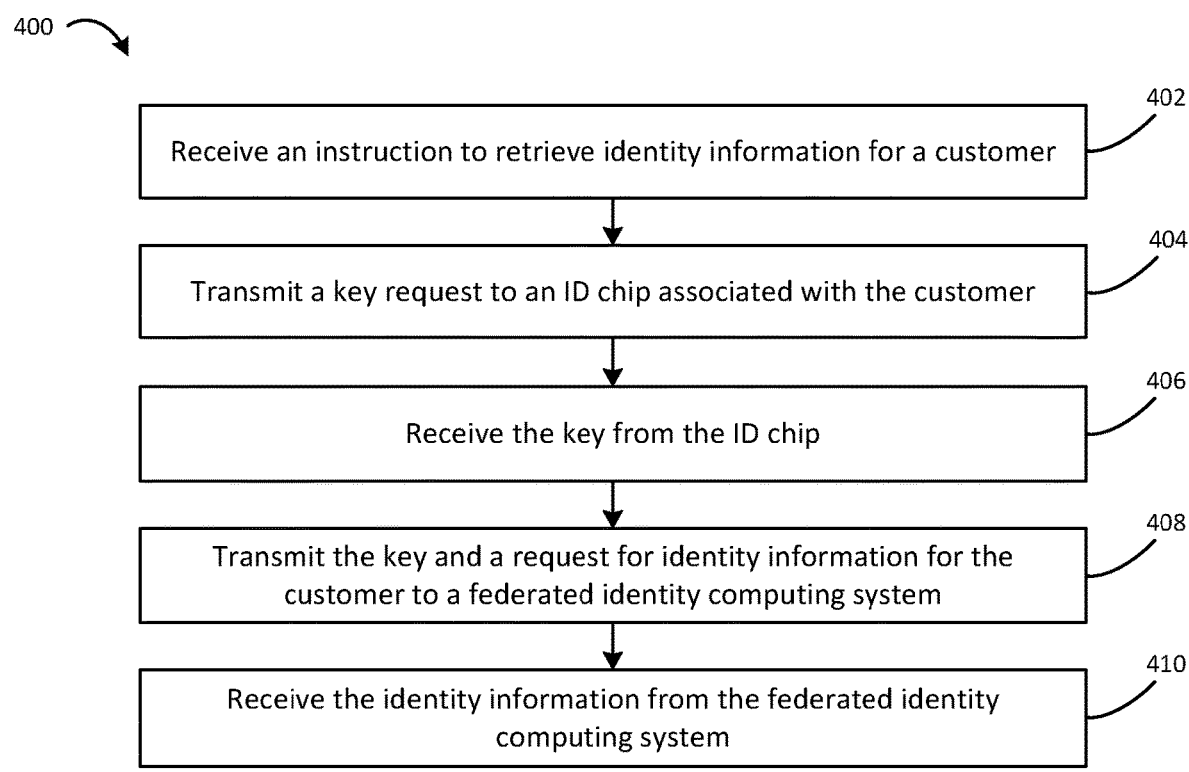
FIG. 4 is a flow diagram illustrating a process of receiving identity information for a customer, according to an example embodiment.

Referring now to FIG. 4, a method 400 of receiving identity information for the customer 106 is shown, according to an example embodiment. At process 402, the requesting party computing system 112 receives an instruction to retrieve identity information for the customer. Accordingly, at process 404, the requesting party computing system 112 transmits a key request to the ID chip 104 associated with the customer 106. Responsive to the key request, at process 406, the requesting party computing system 112 receives the key from the ID chip 104. In some arrangements, the requesting party computing system 112 may only receive the key after the customer 106 authorizes the transmittal of the key. For example, the ID chip 104 may be stored on a smartphone, and the key is transmitted via NFC facilitated by the smartphone. However, in order for the key to be transmitted, the customer 106 must enter in a PIN authorizing the transmittal via a display of the smartphone that the smartphone verifies against a PIN for the customer 106 stored on the smartphone or in a database (e.g., the customer ID database 152).

At process 408, the requesting party computing system 112 transmits the key and a request for identity information for the customer 106 to the federated identity computing system 110. Assuming that the requested identity information is stored in the federated identity computing system 110 and that the request meets preferences entered by the customer 106, as discussed with respect to FIG. 2, at process 410, the requesting party computing system 112 receives the identity information from the federated identity computing system 110.

Referring now to FIGS. 5-9, graphical user interfaces, shown to the customer 106 or to the requesting party associated with the requesting party computing system 112, are illustrated, according to example embodiments. In various arrangements, as illustrated in FIGS. 5-9, the graphical user interfaces may be shown to the customer 106 in response to the customer 106 navigating to a federated identity management page 500 via the customer device 102 or to a requesting party navigating to the federated identity management page 500 via the requesting party computing system 112. For example, the federated identity management page 500 may be a webpage, an application page, etc. that is associated with the federated identity computing system 110.

Figure 5:
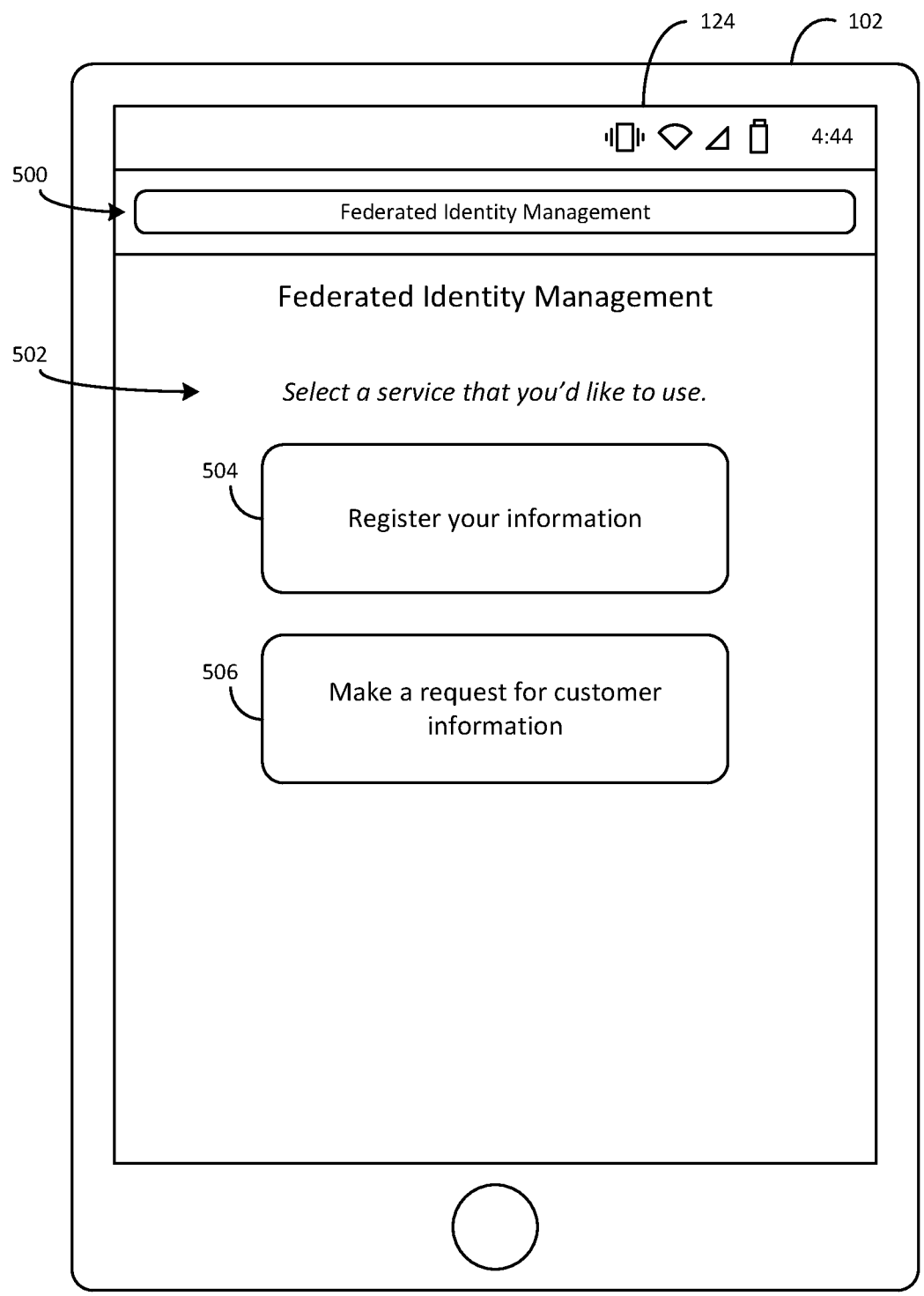
FIG. 5 is a graphical user interface, shown to a customer registering identity information or a party requesting identity information, according to an example embodiment.

Referring first to FIG. 5, the customer 106 has navigated to the federated identity management page 500 via the customer device 102, as shown on the display 124 of the customer device 102. In the embodiment of FIG. 5, once the customer 106 navigates to the federated identity management page 500, the customer 106 is shown a service selection screen 502. The service selection screen 502 includes two buttons: a button 504 that the customer 106 may press to register identity information with the federated identity computing system 110 and a button 506 that the customer 106 may press to make a request for identity information for other customers of the federated identity computing system 110.

Figure 6:
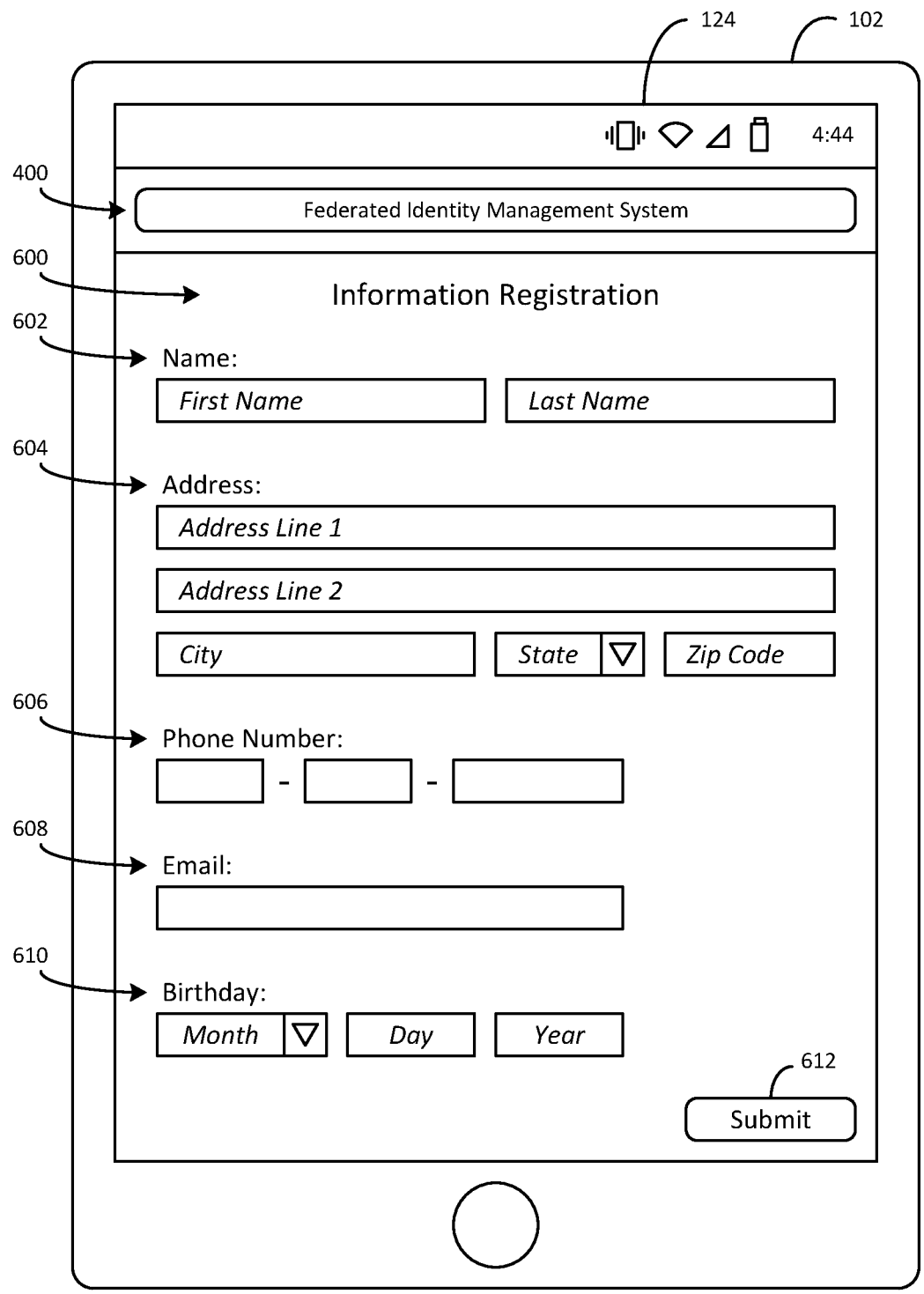
FIG. 6 is a graphical user interface, shown to a customer registering identity information, according to an example embodiment.

If the customer 106 presses the registration button 504, the customer 106 is shown an information registration screen 600, as illustrated in FIG. 6. The information registration screen 600 includes fields whereby the customer 106 may enter identity information for the customer 106. In the embodiment of FIG. 6, these fields include a name field 602, an address field 604, a phone number field 606, an email field 608, and a birthday field 610. However, in other embodiments, the information registration screen 600 may include different and/or additional fields, such as fields for inputting a social security number, usernames and passwords, health information, financial information, biometric information, and so on. Alternatively, the information registration screen 600 may include a physical location for sending one or more pieces of identity information, such as an address to which the customer 106 may mail biometric information such as fingerprints. Furthermore, in various embodiments, the information registration screen 600 may include input fields whereby the customer 106 may input preferences for the identity information.

Figure 7:
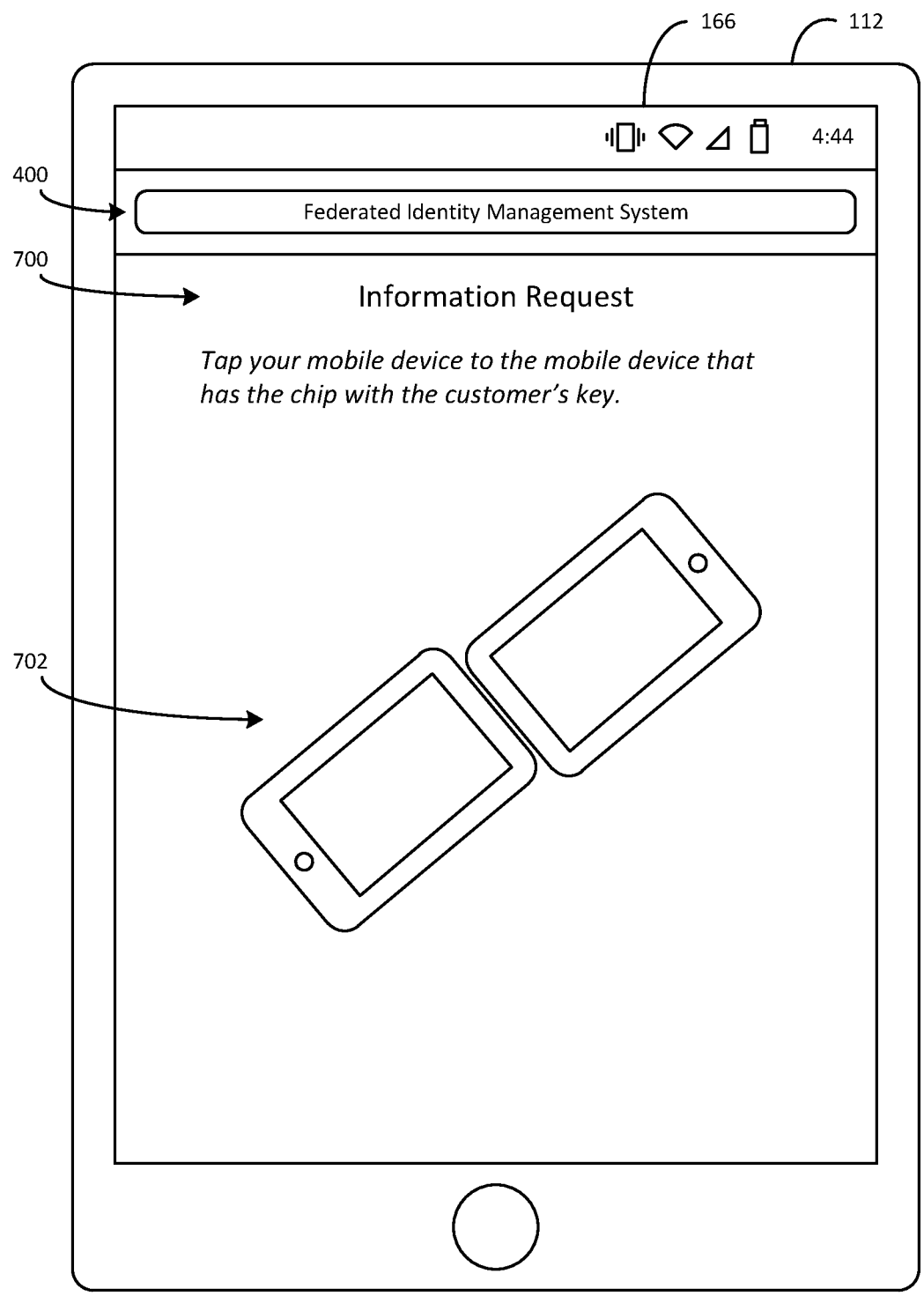
FIGS. 7-9 are graphical user interfaces, shown to a party requesting identity information, according to example embodiments.

However, if instead a requesting party accesses the service selection screen 502 via the requesting party computing system 112, and the requesting party selects the information request button 506, the requesting party is shown an information request screen 700, as illustrated in FIG. 7. The information request screen 700 includes instructions for receiving the key for the customer 106. In the embodiment of FIG. 7, the ID chip 104 is stored on a mobile device associated with the customer 106 (e.g., the customer device 102). Accordingly, the instructions include a diagram 702 showing the requesting party how to receive the key. For example, in the embodiment of FIG. 7, the requesting party may receive the key via an NFC tap between the customer device 102 and the requesting party computing system 112. However, in other embodiments, the requesting party may receive the key differently, such as via the network 108.

Figure 8:
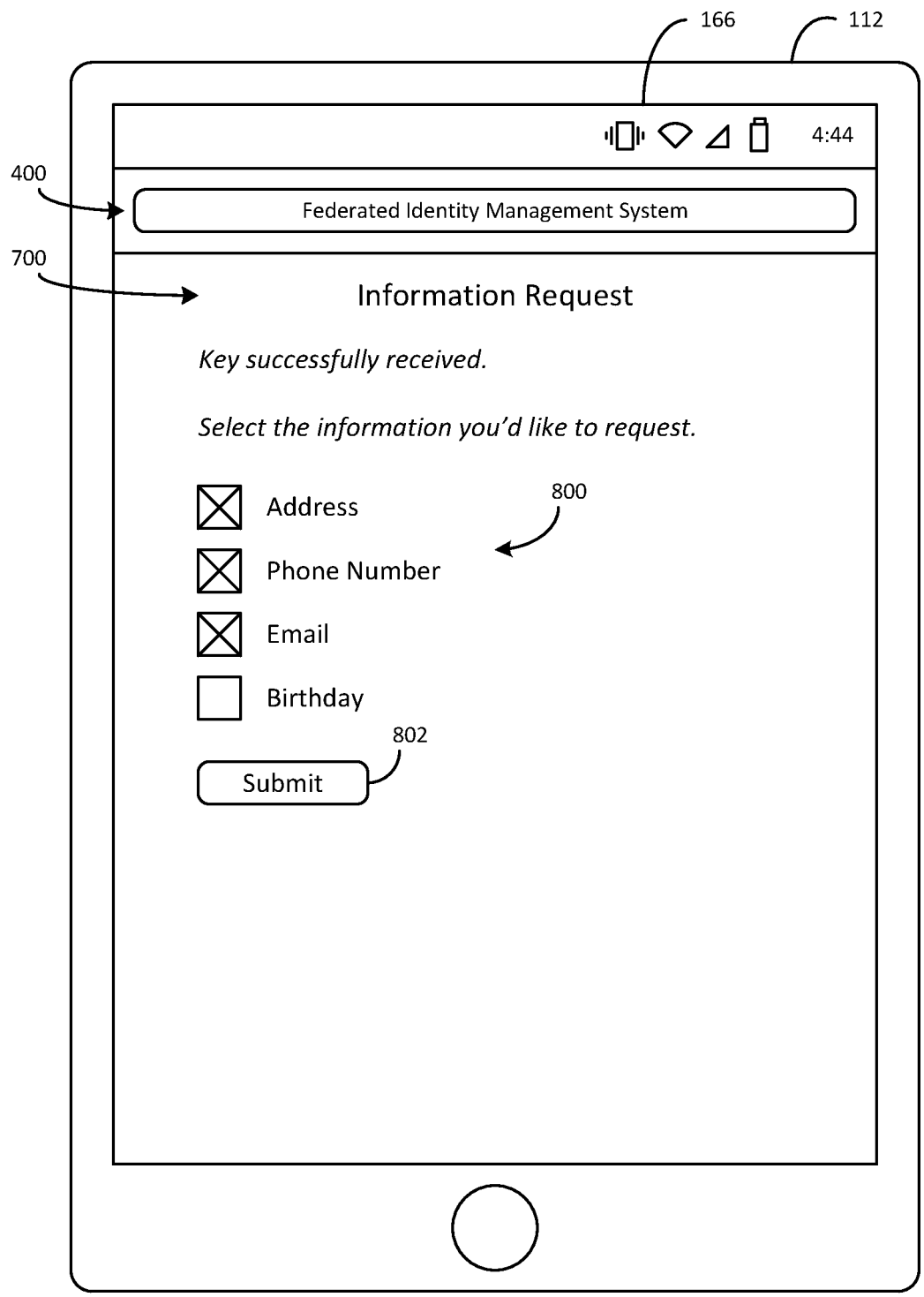

Once the requesting party computing system 112 has received the key and transmitted the key to the federated identity computing system 110, the information request screen 700 displays input fields 800 with pieces of identity information that may be requested from the federated identity computing system 110, as shown in FIG. 8. In the embodiment of FIG. 8, the input fields 800 are for the address, phone number, email address, and birthday of the customer 106. However, in other embodiments, the input fields 800 may include different and/or additional fields for identity information, such as input fields for the social security number, driver's license number, passport number, financial information, health information, biometric information, and so on for the customer 106. Alternatively, in certain embodiments, the input fields 800 may be more open than the input fields 800 shown in FIG. 8, such as fields in which the requesting party may type desired identity information that the federated identity computing system 110 compares to the pieces of identity information stored for the customer 106. Furthermore, in some arrangements, the requesting party computing system 112 may submit the request for identity information at the same time the requesting party computing system 112 submits the key to the federated identity computing system 110.

Figure 9:
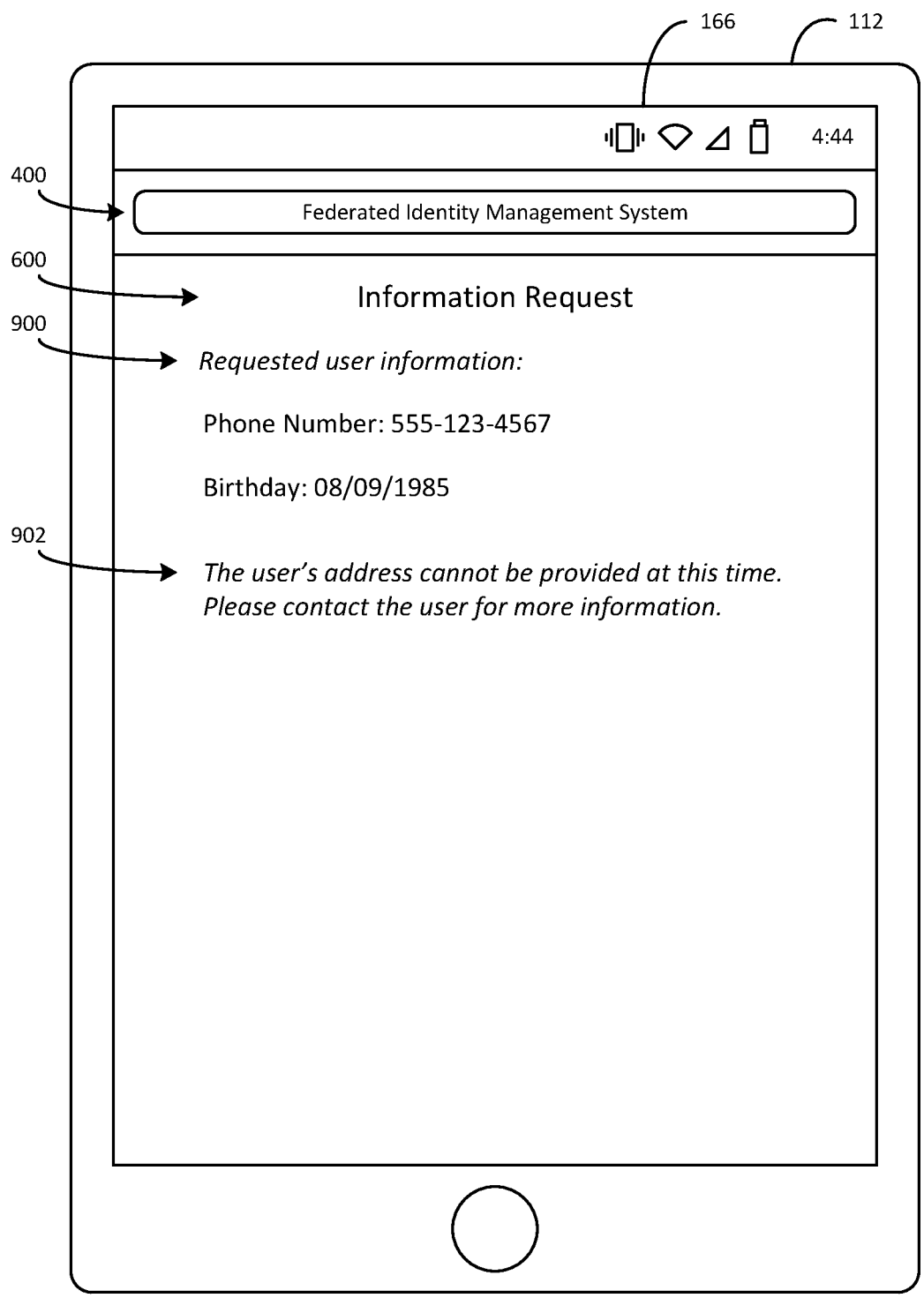

After the federated identity computing system 110 determine whether the requested identity information meets preferences the customer 106 has input for the identity information, the information request screen 700 displays the requested identity information, as shown in FIG. 9. In the embodiment of FIG. 9, the requesting party computing system 112 has received the requested phone number and birthday for the customer 106 in section 900. However, as indicated in section 902, the federated identity computing system 110 has determined that the address for the customer 106 cannot be provided to the requesting party (e.g., because the requesting party does not meet the preferences specified by the customer 106 for providing the address). Alternatively, in some arrangements, the information request screen 700 may only display the identity information that the requesting party is eligible to receive according to the preferences the customer 106 has inputted for the identity information. Accordingly, in the example of FIGS. 8 and 9, the address would not be shown as an input field 800 in FIG. 8.

Those of skill in the art will understand, however, that FIGS. 5-9 depict example graphical user interfaces that may be shown to a customer or a requesting party as part of the federated identity management services provided by the federated identity computing system 110 described herein. In other embodiments, a customer or a requesting party may be shown more, fewer, or different graphical user interfaces than those shown in FIGS. 5-9.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include machine or computer-readable media that are executable by one or more processors (e.g., multiple remote processors connected to each other through any type of network). The machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, is structured to communicate data over a network (e.g., the network 108) includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 108. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
generating, by a federated identity computing system, a graphical user interface including a first button selectable to register one or more pieces of identity information and a second button selectable to request one or more pieces of identity information;
receiving, by the federated identity computing system and in response to receiving an indication of a selection of the first button of the graphical user interface, a plurality of pieces of identity information regarding a customer to register the plurality of pieces of identity information with the federated identity computing system, wherein receiving the plurality of pieces of identity information comprises:
receiving, by the federated identity computing system, a credential associated with an external account held by the customer, the external account provided by a third-party computing system relative to the federated identity computing system;
accessing, by the federated identity computing system, the external account at the third-party computing system using the credential; and
extracting, by the federated identity computing system, at least one piece of identity information regarding the customer from the external account;
receiving, by the federated identity computing system, one or more preferences for each piece of the plurality of pieces of identity information from the customer, wherein the one or more preferences govern distribution of each piece of the plurality of pieces of identity information to requesting parties;
generating, by the federated identity computing system, a key specific to the customer;
provisioning, by the federated identity computing system, the key to an identification chip incorporated within a customer computing device associated with the customer;
transmitting, by the federated identity computing system, the graphical user interface to a computing device of a requesting party that is not the customer;
receiving, from the computing device of the requesting party and by the federated identity computing system and in response to receiving an indication of a selection of the second button of the graphical user interface from the computing device of the requesting party, the key, a request for a piece of identity information, and an identity of the requesting party;
identifying, by the federated identity computing system, the customer based on the received key;
determining, by the federated identity computing system, that a preference for the requested piece of identity information of the plurality of pieces of identity information is met based on the key and the identity of the requesting party; and
providing, by the federated identity computing system, the requested piece of identity information to the requesting party based on the determination that the preference for the requested piece of identity information is met.

2. The method of claim 1, further comprising:
identifying, by the federated identity computing system, that the request is encrypted with a private key associated with the requesting party; and
verifying, by the federated identity computing system, an identity of the requesting party based on identifying that the request was encrypted with the private key associated with the requesting party.

3. The method of claim 1, wherein the one or more preferences include a preference limiting the distribution of a piece of identity information to a certain type of requesting party; and
wherein providing the requested one or more pieces of identity information to the requesting party is based on whether the requesting party is the certain type.

4. The method of claim 1, wherein a preference of the one or more preferences designates that a request for a first piece of identity information must be authorized by the customer before the first piece of identity information is distributed; and
wherein providing the first piece of identity information to the requesting party is based on the customer authorizing the request for the identity information.

5. The method of claim 4, wherein authorizing the request for the identity information further comprises at least one of confirming that the key was received via NFC, receiving a password from the customer computing device, receiving a PIN from the customer computing device, or receiving biometric data from the customer computing device.

6. The method of claim 1, further comprising:
assessing, by the federated identity computing system, a fee to the requesting party for fulfilling the request of providing the requested piece of identity information to the requesting party.

7. A federated identity computing system, comprising:
a network interface structured to communicate data over a network;
at least one processor; and
at least one non-transitory machine readable storage media coupled to the at least one processor and having instructions stored thereon that, when executed by the at least one processor, cause the federated identity computing system to:
generate a graphical user interface including a first button selectable to register one or more pieces of identity information and a second button selectable to request one or more pieces of identity information;

receive, via the network interface and in response to receiving an indication of a selection of the first button of the graphical user interface, a plurality of pieces of identity information regarding a customer, wherein receiving the plurality of pieces of identity information comprises:

receiving a credential associated with an external account held by the customer, the external account provided by a third-party computing system relative to the federated identity computing system;

accessing the external account using the credential; and extracting at least one piece of identity information regarding the customer from the external account at the third-party computing system;

receive, via the network interface, one or more preferences for each piece of the plurality of pieces of identity information from the customer, wherein the one or more preferences govern distribution of each piece of the plurality of pieces of identity information to requesting parties;

generate a key specific to the customer;

provision the key to an identification chip incorporated within a customer computing device associated with the customer;

transmit, via the network interface, the graphical user interface to a computing device of a requesting party that is not the customer;

receive, from the computing device of the requesting party via the network interface and in response to receiving an indication of a selection of the second button of the graphical user interface from the computing device of the requesting party, the key, a request for a piece of identity information, and an identity of the requesting party;

identify the customer based on the received key;

determine that a preference for the requested piece of identity information of the plurality of pieces of identity information is met based on the key and the identity of the requesting party; and provide, via the network interface, the requested piece of identity information to the requesting party based on the determination that the preference for the requested piece of identity information is met.

8. The system of claim 7, wherein the plurality of pieces of identity information comprises at least one of a piece of biographical information, a piece of contact information, a piece of account information, a piece of health information, a piece of financial information, or a piece of biometric information.

9. The system of claim 7, wherein the one or more preferences include a preference limiting the distribution of a piece of identity information to a certain type of requesting party; and wherein the instructions, when executed by the at least one processor, further cause the federated identity computing system to provide the requested one or more pieces of identity information to the requesting party based on whether the requesting party is the certain type.

10. The system of claim 7, wherein a preference of the one or more preferences designates that a request for a first piece of the plurality of pieces of identity information must be authorized by the customer before the first piece of the plurality of pieces of identity information is distributed.

11. The system of claim 7, wherein the instructions, when executed by the at least one processor, further cause the federated identity computing system to verify that each piece of the plurality of pieces of identity information is correct and include each piece of the plurality of pieces of identity information in an identity profile for the customer.

12. The system of claim 7, wherein the instructions, when executed by the at least one processor, further cause the federated identity computing system to:

generate an updated key specific to the customer; and provision the updated key to the identification chip to replace the key.

13. A computing device associated with a customer, comprising:

at least one processor; and at least one non-transitory machine readable storage media having a federated identity application stored thereon, the at least one non-transitory machine readable storage media coupled to the processor, and the federated identity application including instructions that, when executed by the at least one processor, cause the at least one processor to:

generate a graphical user interface including a first selectable feature to register one or more pieces of identity information and a second selectable feature to request one or more pieces of identity information;

present the graphical user interface;

receive, in response to receiving an indication of a selection of the first selectable feature of the graphical user interface, a plurality of pieces of identity information regarding the customer, wherein receiving the plurality of pieces of identity information comprises:

receiving a credential associated with an external account held by the customer, the external account provided by a third-party computing system relative to a federated identity computing system;

accessing the external account using the credential; and extracting at least one piece of identity information regarding the customer from the external account at the third-party computing system;

receive at least one preference for each piece of the plurality of pieces of identity information from the customer, wherein the at least one preference governs distribution of each piece of the plurality of pieces of identity information to requesting parties;

transmit the plurality of pieces of identity information and the at least one preference for each piece of identity information to the federated identity computing system;

receive a request for a key from a requesting party computing system;

transmit the key to the requesting party computing system, wherein the key is configured to provide access to at least one piece of identity information regarding the customer to the requesting party computing system.

14. The computing device of claim 13, wherein the at least one non-transitory machine readable storage media stores a first piece of identity information and wherein the instructions, when executed by the at least one processor, further cause the at least one processor to transmit the first piece of identity information to the requesting party computing system.

15. The computing device of claim 13, wherein the at least one preference includes a preference to at least one of limit the distribution of a piece of identity information to a certain type of requesting party or designate that a request for a piece of identity information must be authorized by the customer.

16. The computing device of claim 13, further comprising a local data communication interface configured to receive the request for the key and to transmit the key to the requesting party computing system via a short-range wireless communication.

17. The computing device of claim 16, wherein the local data communication interface is one of a near field communication device, a radio-frequency identification device, or a Bluetooth device.

18. The computing device of claim 13, wherein the instructions, when executed by the at least one processor, further cause the at least one processor to:
- receive a request for the customer to authorize a transmittal of a piece of identity information to the requesting party computing system;
- display the request for the customer to authorize the transmittal;
- receive an authorization from the customer regarding the request; and
- transmit the authorization to the federated identity computing system.

* * * * *